United States Patent Office

3,465,808
Patented Sept. 9, 1969

3,465,808
PLASTIC PATTERN METHOD FOR INVESTMENT CASTING
Stuart Z. Uram, Canton, Ohio, assignor to TRW Inc., Cleveland, Ohio, a corporation of Ohio
No Drawing. Filed Sept. 7, 1966, Ser. No. 577,786
Int. Cl. B22e 9/04; B22c 7/02; B22d 29/00
U.S. Cl. 164—36                                   2 Claims

ABSTRACT OF THE DISCLOSURE

The disclosure relates to a method of forming a shell mold using a pattern composed of a mixture of polystyrene and a water soluble ethylene oxide polymer and removing the pattern after formation of the shell mold by treatment with steam under pressure.

---

The present invention relates to the field of investment casting, and more specifically to an improved pattern material to be used in the preparation of ceramic shell molds.

Historically, mold-making procedures using investment techniques started with the use of wax as a pattern material giving rise to the name "lost wax" process for the field of mold manufacture for investment casting using disposable patterns. In more recent times, there has been an increase in use of thermoplastic resins, particularly polystyrene, as a substitute for the was. The plastic patterns have certain advantages over wax in some areas. Plastic materials such as polystyrene have good hot strength properties, dimensional stability, and ease of assembly and handling. The stiffness of plastic patterns is also desirable in building up the ceramic shell about the pattern.

One of the major drawbacks to the use of such plastic patterns, however, is the necessity to take very special precautions in removing the plastic pattern from the shell without cracking the shell. For example, plastic patterns may tend to distort the green investment more than waxes during the meltout operation. The present invention overcomes this difficulty by providing a pattern composition which is considerably easier to remove from the green investment, using ordinary meltout procedures and apparatus, than has heretofore been possible with thermoplastic pattern materials.

One of the objects of the present invention is to provide an improved pattern-making material of the thermoplastic type which can be readily removed without damaging the surrounding green ceramic investment.

Another object of the invention is to provide an improved pattern-making material of the thermoplastic type capable of producing patterns having good surface finish, and sufficient stiffness and dimensional integrity to provide excellent investment molds.

Another object of the invention is to provide a pattern-making material employing polystyrene as the essential pattern-forming material, but being readily removed by treatment in a steam autoclave.

A further object of the invention is to provide an improved method for the manufacture of investment casting molds by employing an improved disposable pattern material.

A further object of the invention is to provide a method for the manufacture of investment casting molds which makes use of a steam autoclave to eliminate the plastic pattern material from the shell without danger of cracking the shell.

In accordance with the present invention, I provide a pattern material which consists essentially of a mixture of polystyrene and a water soluble polymer compatible with the polystyrene and providing improved meltout properties when subjected to high temperatures. In the preferred embodiment of the present invention, I employ a mixture of polystyrene and a water soluble polymer of ethylene oxide, the latter constituting from 10 to 50% by weight of the mixture of the two ingredients. The term "water soluble" as used herein is used to denote a material which is soluble in water at least to the extent of providing a 5% solution by weight at 25° C.

There are numerous ethylene oxide polymers on the market which are suitable for combination with polystyrene as a pattern-making material. Particularly good results are obtained through the use of ethylene oxide polymers which have a molecular weight in the range from about 100,000 to about 2,000,000. Such polymers have a viscosity, in a 5% aqueous solution, of from about 100 to 2000 centipoises at 25° C. In this connection, it should be noted that it is not necessary to use a single ethylene oxide polymer to provide the desired molecular weight, as a mixture of polymers having molecular weights (and consequently viscosities) above and below the stated ranges can be used in proper proportions to provide an average molecular weight or viscosity in the preferred ranges.

The investment casting mold-making operation using the plastic materials of the present invention is not changed to any significant degree with the use of the new pattern material. The mixture of polystyrene and one or more of the ethylene oxide polymers is placed in a conventional plastic injection machine and injected into a die, usually at injection pressures of from 300 to 3500 pounds per square inch. The injection temperatures are usually in excess of 250° F. Upon solidification, a pattern is produced in the die which has sufficient stiffness and dimensional integrity that it can be used for the manufacture of molds for the investment casting process.

The resulting pattern can be used to build up a ceramic shell mold in any of a variety of processes. One particularly preferred method is that which is described in Mellen et al. U.S. Patent No. 2,932,864 of April 19, 1960. In accordance with the procedure described in that patent, the disposable pattern material is dipped in an aqueous ceramic slurry having a temperature about the same as that as the pattern material to form a refractory layer of a few mils in thickness. A typical slurry may contain ceramic material such as zirconium oxide, a binder such as colloidal silica, and a thickener and low temperature binder such as methyl cellulose. The initial layer while still wet is then dusted with small particles (40 to 200 mesh) of a refractory glass composition such as that known as "Vycor" which is a finely divided high silicon oxide glass containing about 96% silica and a small amount of boric acid together with traces of aluminum, sodium, iron and arsenic. The pattern with the dusted wet refractory layer on it can then be suspended on a conveyor and moved through a drying oven having a controlled humidity and temperature, wherein the coated pattern is dried adiabatically.

The steps of dipping, dusting, and adiabatic drying are then repeated using air at progressively lower humidities for succeeding coats. For example, the first two coats can be dried with air having a relative humidity of 45 to 55%. The third and fourth coats can be dried at a relative humidity of 35 to 45%, the fifth and sixth coats with a relative humidity of 25 to 30%, and finally the last coat with a relative humidity of 15 to 25%.

The first layer is preferably applied at a thickness of about 0.005 to 0.020 inch, and the fine refractory particles are dusted onto the wet layer with sufficient force to embed the particles therein. It is preferred that the dusting procedure be used to provide a dense uniform cloud of fine particles that strike the wet coating with sufficient impact force. The force should not be so great, however, as to break or knock off the wet prime layer from the pattern. This process is repeated until a plurality of integrated layers is obtained, the thickness of the layers each being about 0.005 to 0.020 inch.

After the shell has been completed, the usual shell thickness being between ⅛ and ¼ inch, it is thoroughly dried and then the resulting green investment mold is ready for removal of the disposable pattern. With the improved pattern material of the present invention, pattern removal can be readily effected by placing the coated pattern in a steam autoclave where it is subjected to steam at a pressure of 100 pounds per square inch or so. This melts the plastic pattern, and the shell may then be transferred to a high temperature firing oven to burn out the last bit of plastic residue and to fire the ceramic material. The resulting shell mold is hard, smooth and relatively permeable.

The following specific examples illustrate the manner in which the improved pattern compositions of the present invention can be made.

EXAMPLE I

A pattern material was made up with the following composition:

Table I

| | Percent by weight |
|---|---|
| "Polyox WSR N-10" (viscosity of 10-20 centistokes for 5% aqueous solution at 25° C.) | 5 |
| "Polyox WSR N-3000" (viscosity of 2250-3350 centistokes for 5% aqueous solution at 25° C.) | 15 |
| Polystyrene | 80 |

The polystyrene employed in the foregoing composition was a commercially available material of a type suitable for ordinary injection molding. A ceramic shell mold was built up about the resulting pattern, using a water base colloidal silica slurry. After the shell had been thoroughly dried, it was placed in a steam autoclave and pressurized with steam to 100 pounds per square inch. The plastic pattern material was substantially completely removed, and then the shell was transferred to a high temperature firing oven operating at a temperature of 1500 to 1900° F., to complete the rigidification of the mold structure. The shell mold that resulted was smooth, strong and relatively porous.

The same procedure was carried out using polystyrene alone at the pattern material. It was found that under the conditions of operation, the shell cracked in the autoclave when pattern removal was attempted.

The properties of the pattern material can be controlled by adjustment of the relative amount and character of the ethylene oxide polymer employed. Using polymers which have very low molecular weight and viscosity produces mixtures which are more difficult to inject, but the patterns produced have the most suitable surface finish. Adding up to 50% of a high viscosity, high molecular material improves the injection properties but reduces the quality of the surface finish. As the amount of ethylene oxide polymers increases, the stiffness of the patterns tends to be decreased, but at the same time, it considerably simplifies the elimination of the plastic pattern from the finished ceramic shell.

From the foregoing, it will be understood that the pattern making composition of the present invention provides a plastic pattern material which has all of the advantages of plastic patterns while making it far easier to remove the pattern material from the green investment mold. The pattern materials of the present invention can be used with conventional mold-making processes and with conventional equipment so that the cost of the investment mold-making process is not significantly increased.

It should be evident that various modifications can be made to the described embodiment without departing from the scope of the present invention.

I claim as my invention:

1. The method of forming an investment mold which comprises forming a mixture of polystyrene and a water soluble ethylene oxide polymer compatible with said polystyrene, with said polymer of ethylene oxide constituting from 10 to 50% weight of the mixture, shaping said mixture into a pattern, investing the resulting pattern in a particulate ceramic investment material to form a ceramic shell mold and treating the resulting shell mold with the steam under pressure to remove the pattern material from said shell mold.

2. The method of claim 1 in which said polymer of ethylene oxide has a molecular weight in the range from about 100,000 to 2,000,000.

References Cited

UNITED STATES PATENTS

| 2,420,851 | 5/1947 | Zahn et al. | |
| 2,815,552 | 12/1957 | Turnbull et al. | |
| 2,456,424 | 12/1948 | Neiman | 164—246 |
| 2,994,931 | 8/1961 | Operhall et al. | 164—246 |
| 3,063,113 | 11/1962 | Operhall et al. | |

FOREIGN PATENTS

| 1,215,874 | 5/1966 | Germany. |

J. SPENCER OVERHOLSER, Primary Examiner

V. K. RISING, Assistant Examiner

U.S. Cl. X.R.

164—132, 246